United States Patent [19]

Khoury et al.

[11] Patent Number: 4,835,421
[45] Date of Patent: May 30, 1989

[54] SQUARING CIRCUITS IN MOS INTEGRATED CIRCUIT TECHNOLOGY

[75] Inventors: John M. Khoury, New Providence; James M. Trosino, Edison, both of N.J.

[73] Assignee: American Telephone and Telegraph Company, AT&T Bell Laboratories, Murray Hill, N.J.

[21] Appl. No.: 169,675

[22] Filed: Mar. 18, 1988

[51] Int. Cl.[4] .................... G06G 7/20; G06G 7/12; H03K 5/00
[52] U.S. Cl. .................... 307/491; 328/132; 328/144; 307/490; 307/497; 307/500; 307/501; 307/261
[58] Field of Search ............ 307/490, 491, 494, 498, 307/500, 501, 261; 328/132, 144

[56] References Cited

U.S. PATENT DOCUMENTS

| | | | |
|---|---|---|---|
| 3,113,274 | 12/1963 | Utt | 328/144 |
| 3,441,728 | 4/1969 | Halfhill et al. | 328/144 |
| 3,681,700 | 8/1972 | Rennick | 328/144 |
| 3,916,223 | 10/1975 | Fette et al. | 307/261 |
| 4,005,283 | 1/1977 | Rhodes | 307/490 |
| 4,242,638 | 12/1980 | Glaser et al. | 328/144 |
| 4,445,053 | 4/1984 | Jaeger et al. | 328/144 |
| 4,539,491 | 9/1985 | Nishioka et al. | 307/261 |
| 4,585,961 | 4/1986 | Daubert | 307/491 |
| 4,736,434 | 4/1988 | Filliman | 307/490 |

*Primary Examiner*—Stanley D. Miller
*Assistant Examiner*—Trong Quang Phan
*Attorney, Agent, or Firm*—David I. Caplan

[57] ABSTRACT

A squaring circuit (FIG. 1, 100; FIG. 3, 300) includes an operational amplifier (10) having its positive input terminal connected to ground, its negative input terminal connected through a nonlinear voltage-to-current conversion device (FIG. 1, $T_2$, $T_3$; FIG. 3, $M_1$, $M_2$, $T_2$) to a balanced source of the input voltage ($\pm V_{IN}$), and its output terminal connected through a linear current-to-voltage conversion device (FIG. 1, $R_1$; FIG. 3, $T_1$, $C_1$) to its negative input terminal. The circuit can be made to have a balanced output (FIGS. 2 and 5), and the circuit can be made in the configuration of either a continuous-time circuit (FIGS. 1 and 2) or a sampled-data circuit (FIGS. 3 and 5).

18 Claims, 3 Drawing Sheets

SQUARING CIRCUITS IN MOS INTEGRATED CIRCUIT TECHNOLOGY

FIELD OF THE INVENTION

This invention relates to semiconductor MOS integrated circuits, and more particularly to such circuits which produce an output signal which is proportional to the square of an input signal voltage, i.e., squaring circuits.

BACKGROUND OF THE INVENTION

In telecommunication systems, squaring circuits are useful in a variety of contexts. For example, since squaring a wave changes its frequency in a signal receiver, a squaring circuit is useful for shifting the frequency range ("band") of an incoming modulated carrier wave to a different frequency range. Such shifting is useful in many situations. In particular, it is useful in modems at a receiver where it is desired to process the information on a pulsed carrier wave emanating from a transmission channel in which the information is coded as symbols represented by means of phase modulation of the pulses on the carrier. That is, the carrier is modulated by the (typically non-rectangular) pulses, and these pulses are periodic except for a separate phase shift that is imposed upon each pulse in accordance with the symbol corresponding to that pulse, whereby the pulse contains information. In such cases, among other things, it is desired at the receiver to determine the symbol rate—i.e., to achieve "timing recovery"—by first squaring the incoming modulated carrier wave by means of a squaring circuit in order to produce or enhance the energy component at the symbol rate prior to further signal processing, the phase modulated pulsed carrier itself as it emanates from the channel containing little or no energy at the symbol rate. As is known in the art, it is important in these cases that the output of the squaring circuit be pure. That is, it is important that the output produced by the squaring circuit be free of all odd-power terms, i.e., be free of all frequency components that have frequencies equal to odd-integer multiples of the input frequency, as well as be free of all even-power terms of higher order than the second. Otherwise, confusion would be introduced by the squaring circuit into the determination ("recovery") of the symbol rate.

In U.S. Pat. No. 4,585,961, issued on Apr. 29, 1986, to S. J. Daubert entitled "Semiconductor Integrated Circuits for Squaring a Signal with Suppression of the Linear Component," a squaring circuit having a pure output is disclosed. The circuit contains a pair of matched substantially identical paths to which an input voltage is applied. Each of the paths consists of a double-ended difference amplifier, which receives the input voltage and a dual-to-single-ended converter, which receives the output of the difference amplifier and delivers its own single-ended output to a nonlinear/summing device—such as a squarer/summer network—for non-linearly transforming and summing the single-ended outputs of the converters in the two paths. Although the Daubert squaring circuit is useful for many purposes, nevertheless, because its MOS transistors operate in saturation and hence its output contains a relatively large d.c. offset (a relatively large term of zero order), an added voltage level shifter is needed in those cases where the output of the squaring circuit is used to drive another circuit in which this offset is undesirable, for example, another circuit in which all signals are referenced to ground, as in switched-capacitor filters and continuous-time filters. It would be desirable to have a squaring circuit without a dc offset and hence without the need for the added level shifts, because it consumes an undesirable amount of semiconductor chip area.

SUMMARY OF THE INVENTION

A circuit for squaring a balanced input $(-V_{IN}, +V_{IN})$ and having substantially no offset in its output is characterized by (a) an operational amplifier having a negative input terminal and at least a first output terminal;

(b) current-to-voltage conversion means, connecting a first output terminal of the operational amplifier to the negative input terminal thereof, for supplying negative feedback to the amplifier; and (c) nonlinear voltage-to-current conversion means for receiving the balanced input $(-V_{IN}, +V_{IN})$ and for delivering current to the first current-to-voltage conversion means, whereby an output $(V_{OUT})$ developed at the first output terminal of the operational amplifier is essentially linearly proportional to the square of the input $(V_{IN}^2)$.

In some specific embodiments (FIGS. 1 and 2) the circuit has a configuration that is useful for continuous-time operation; in other specific embodiments (FIGS. 3 and 5) the circuit has a sampled-data configuration. In a specific embodiment (FIG. 3) of the sampled data configuration, the need for matched (substantially identical) transistors is avoided. Also, in some specific embodiments (FIGS. 2 and 5) the circuit has a balanced output configuration, which is useful for improved performance in that a balanced circuit in general has the advantages of improved power supply rejection and larger signal handling capability.

BRIEF DESCRIPTION OF THE DRAWINGS

This invention together with its advantages, features, and characteristics may be better understood from the following detailed description in which.

DETAILED DESCRIPTION

Figure 1:
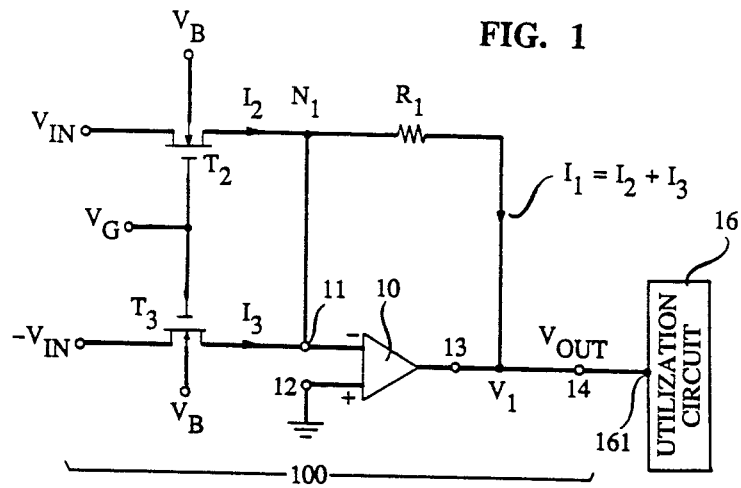
FIG. 1 is a schematic diagram of a squaring circuit having a continuous-time operational configuration and having a single-ended output configuration, in accordance with a specific embodiment of the invention.

As shown in FIG. 1, a continuous-time squaring circuit 100, having a circuit output terminal 14, includes a matched pair of N-MOS (n-channel MOS) transistors $T_2$ and $T_3$. By the term "matched pair" it is meant that the structures of the two transistors are substantially identical. The transistors $T_2$ and $T_3$ have one of their high-current carrying terminals (source or drain) connected to a common node $N_1$, and have another of their high-current carrying terminals connected to receive from a balanced source (not shown) a pair of balanced input voltages $V_{IN}$ and $-V_{IN}$, respectively. As known in the art, where a system supplies only $V_{IN}$, then $-V_{IN}$ can be obtained from a single-ended-to-double-ended voltage converter. Thus, a balanced source of $V_{IN}$ and $-V_{IN}$ is readily available.

The transistors $T_2$ and $T_3$ (FIG. 1) have their gate electrodes biased to a common voltage $V_G$ and their substrates biased to another common voltage $V_B$. For example, $V_G = 1.5$ volts, and $V_B = -1.5$ volts.

A single-ended operational amplifier 10 (FIG. 1) has a negative input terminal 11 connected to the node $N_1$ and a positive input terminal 12 connected to ground (0 volts). An output terminal 13 of the amplifier 10 is connected through a resistor $R_1$ to the circuit output terminal 14 and to the node $N_1$. Advantageously, this resistor $R_1$ is linear, i.e., is characterized by a linear relationship between current through it and voltage across it; and thus the resistor $R_1$ serves to convert a current into a voltage in a linear manner. The circuit output terminal 14 is connected to an input terminal 161 of a utilization circuit 16, such as a filter circuit, for utilizing an output $V_{OUT}$ of the squaring circuit 100.

It is important that the bias voltage $V_G$ and the input voltage $V_{IN}$ are selected such that the MOS transistors $T_2$ and $T_3$ operate in their non-saturation regions; that is, as known in the art, advantageously the peak-to-peak input $V_{IN}$ is maintained at values less than $2(V_G - V_T)$ where $V_T$ is the threshold voltage, typically about 1.0 volt. The drain-to-source current I of each transistor operated in its non-saturation region is related to the source and drain voltages $v_S$ and $v_D$, respectively, by the known expression:

$$I = K[a_1(v_D - v_S) + a_2(v_D^2 - v_S^2) + a_3(v_D^3 - v_S^3) + a_4(v_D^4 - v_S^4) + \ldots], \quad (1)$$

where K is a constant that depends upon the size (channel width and length of the transistor while $a_1$, $a_2$, $a_3$ and $a_4$ are constants that depend upon other parameters such as gate voltage $V_G$, substrate voltage $V_B$, and the remaining transistor structure parameters. It is important that $T_2$ and $T_3$ form a matched pair, so that they have the same K as well as the same $a_i$ for all i.

It should be noted that in Eq. (1) it is assumed that $v_D$ and $v_S$ are measured with respect to ground, and that Eq. (1) can be found in a paper by M. Banu and Y. Tsividis entitled "Detailed Analysis of Nonidealities in MOS Fully Integrated Active RC Filters Based on Balanced Networks," published in *IEE Proceedings.* Vol. 131, Pt. G. No. 5, pp. 190-196 (Oct. 1984), at p. 190, Eq. (3).

Advantageously, as is obtained with the ordinary MOS transistor, the properties of transistors $T_2$ and $T_3$ are such that the second-order term, $a_2 (v_S^2 - v_D^2)$, is much larger than any of the other terms of higher power. Note that unlike the situation in the saturation region, in the non-saturation region there is no undesired zero-order (constant, or DC) term in the current I.

During operation of the circuit 100, the transistors $T_2$ and $T_3$ operate in their non-saturation regions and deliver currents $I_2$ and $I_3$, respectively, to the node $N_1$. Since an operational amplifier cannot pass current through itself, the sum total of $I_2 + I_3 = I_1$ passes through the resistor $R_1$ which converts this current $I_1$ into a voltage drop $I_1 R_1$. However, the operational amplifier 10, as is the case with any operational amplifier, for all practical purposes cannot support any voltage difference across its input terminals 11 and 12. But its positive input terminal 12 is grounded. Accordingly, the voltage at node $N_1$ will be essentially ground (0 volts), and the voltage drop $I_1 R_1$ will be equal in absolute value to the output voltage $V_{OUT}$ which is developed at the output terminal 14. Thus, $$(I_2 + I_3) R_1 = I_1 R_1 = -V_1 = -V_{OUT}. \quad (2)$$

On the other hand, assuming $V_{IN}$ to be positive, with $T_2$ and $T_3$ being substantially identified n-channel MOS (N-MOS) transistors, the drain voltage $V_D$ of $T_2$ will be equal to $V_{IN}$, and its source voltage $V_S$ will be zero, again because the voltage at node $N_1$ will be equal to zero (ground). At the same time, the source voltage $V_S$ of transistor $T_3$ will be equal to $-V_{IN}$, and its drain voltage $V_D$ will be zero. The drain-to-source currents of $T_2$ and $T_3$, each in accordance with Eq. (1), will be $I_2$ and $-I_3$, respectively. Hence, $I_2$ and $-I_3$ have equal but opposite even-order terms ($\pm K a_2 V_{IN}^2$; $\pm K a_4 V_{IN}^4$; ...) in their dependence (eq. 1) upon source and drain voltage, but have equal odd-order terms, provided only that the transistors $T_2$ and $T_3$ are matched so that they have the same K, as well as the same $a_i$ for all i. Consequently, all odd-order terms cancel one another in the expression $I_1 = I_2 + I_3$, and thus they do not appear in the output, whereas the even-order terms are doubled in the output:

$$V_{OUT} = -2 R_1 K (a_2 V_{IN}^2 + a_4 V_{IN}^4 + \ldots) \quad (3)$$

Ordinarily, the fourth-order term $a_4 V_{IN}^4$, as well as all other higher order terms, is so small relative to the second-order term $a_2 V_{IN}^2$ that it can be neglected for all practical purposes. Thus, according to Eq. (3), the squaring circuit 100 accurately produces an output voltage that is equal to the square of the input voltage to within a multiplicative constant ($-2 R_1 K a_2$), i.e., is linearly proportional to the square of the input voltage, as is desired in a squaring circuit.

The resistor $R_1$ in practice is not ordinarily easy to obtain as a linear device as assumed above. Moreover, the constant ($-2 R_1 K a_2$) undesirably varies with semiconductor processing variations, because the resistor $R_1$ does not track the transistors $T_2$ and $T_3$. Further, the circuit 100 is not balanced in its output even though it is balanced in its input. Despite these considerations, the circuit 100 is useful in some contexts.

Figure 2:
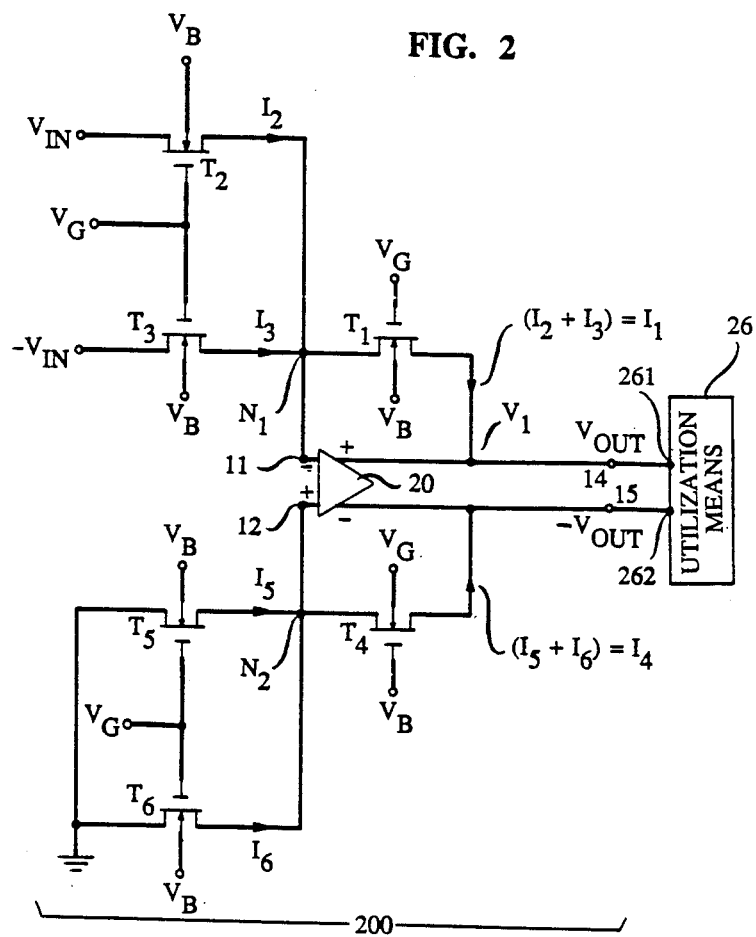
FIG. 2 is a schematic diagram of a squaring circuit, having a continuous-time operational configuration and having a balanced output configuration, in accordance with another specific embodiment of the invention.

FIG. 2 shows the squaring circuit 200, a balanced form of the circuit 100 described above with the resistor R, replaced by a transistor $T_1$. Elements of FIG. 2 that are similar to elements of FIG. 1 are denoted by the same reference labels. A utilization circuit 26, typically a balanced circuit, is connected for receiving balanced outputs $V_{OUT}$ and $-V_{OUT}$ which are developed at the squaring circuit output terminals 14 and 15. By inspection, the squaring circuit 200 in FIG. 2 replaces the single-ended operational amplifier 10 of the circuit 100 of FIG. 1 by a balanced output operational amplifier 20 and adds N-MOS transistors $T_4$, $T_5$, and $T_6$ on the positive input side of the amplifier, corresponding to N-MOS transistors $T_1$, $T_2$, and $T_3$, respectively, in the negative input side. Note that the input voltage applied to both $T_5$ and $T_6$, however, is ground potential rather than $V_{IN}$ and $-V_{IN}$ applied to $T_2$ and $T_3$. The positive and negative output terminals of the amplifier 20 are separately connected to circuit output terminals 14 and 15, respectively.

Advantageously, the transistors $T_5$ and $T_6$ are matched to each other and to the transistors $T_2$ and $T_3$ (which are also substantially identical to each other). Likewise, the transistors $T_1$ and $T_4$ are mutually matched, but are not ordinarily matched to $T_2$, $T_3$, $T_5$, and $T_6$. The voltages $V_{OUT}$ and $-V_{OUT}$ which are developed at the circuit output terminals 14 and 15 are delivered to a pair of input terminals 261 and 262 of a utilization means 26. The voltages $V_{OUT}$ and $-V_{OUT}$ will be essentially the square and the negative of the square, respectively, of the input voltage $V_{IN}$, as can be seen from the following analysis of operation.

During operation, as explained above, the positive and negative input terminals of the operational amplifier 20 will have essentially the same voltage potential, say $V_x$. Due to matching of transistors, $K_2 = K_3 = K_5 = K_6$ and $K_1 = K_4$. Accordingly, from Eq. (1):

$$I_2 = K_2[a_1(V_{IN} - V_x) + a_2(V_{IN}^2 - V_x^2) + a_3(-V_{IN}^3 - V_x^3) + \ldots] \quad (4)$$

$$-I_3 = K_2[a_1(V_x + V_{IN}) + a_2(V_x^2 - V_{IN}^2) + a_3(V_x^3 + V_{IN}^3) + \ldots] \quad (5)$$

where it should be noted again that in Eq. (5) the source-to-drain current flows through $T_2$ from right to left, whereas FIG. 2 indicates that $I_2$ flows from left to right in FIG. 2 (again assuming $T_2$ is an N-MOS transistor matched to $T_3$ and $V_{IN}$ is of positive polarity). Thus, since the current $I_1$, through $T_1$ is given by $I_1 = I_2 + I_3$, it follows that $$-I_1 = 2K_2[a_1V_x + a_2(V_x^2 - V_{IN}^2) + a_3(V_x^3) + \ldots] \quad (6)$$

But it is also true from Eq. (1) applied to the transistor $T_1$ that:

$$+I_1 = K_1[a_1(V_x - V_{OUT}) + a_2(V_x^2 - V_{OUT}^2) + a_3(V_x^3 - V_{OUT}^3) + \ldots] \quad (7)$$

Combining Eqs. (6) and (7):

$$2K_2[a_1V_x + a_2(V_x^2 - V_{IN}^2) + a_3V_x^3 + \ldots] = -K_1[a_1(V_x - V_{OUT}) + a_2(V_x^2 - V_{OUT}^2) + a_3(V_x^3 - V_{OUT}^3) + \ldots] \quad (8)$$

Similarly:

$$-I_5 = K_2[a_1V_x + a_2V_x^2 + a_3V_x^3 + \ldots] \quad (9)$$
$$-I_6 = K_2[a_1V_x + a_2V_x^2 + a_3V_x^3 + \ldots] \quad (10)$$
$$+I_4 = K_1[a_1(V_x + V_{OUT}) + a_2(V_x^2 - V_{OUT}^2) + a_3(V_x^3 + V_{OUT}^3) + \ldots] \quad (11)$$

Likewise, since $I_4 = I_5 + I_6$, it follows that $$-K_1[a_1(V_x + V_{OUT}) + a_2(V_x^2 - V_{OUT}^2) + a_3(V_x^3 + V_{OUT}^3) + \ldots] = 2K_2[(a_1V_x + a_2V_x^2 + a_3V_x^3 + \ldots)] \quad (12)$$

Combining Eqs. (8) and (12), it follows that $$-2K_2a_2V_{IN}^2 - K_1[a_1(V_x + V_{OUT}) + a_2(V_x^2 - V_{OUT}^2) + a_3(V_x^3 + V_{OUT}^3) + \ldots] = -K_1[a_1(V_x - V_{OUT}) + a_2(V_x^2 - V_{OUT}^2) + a_3(V_x^3 - V_{OUT}^3) + \ldots], \quad (13)$$

from which it follows that $$-K_2a_2V_{IN}^2 = K_1[a_1V_{OUT} + a_3V_{OUT}^3 + \ldots] \quad (14)$$

Retaining only terms of up to second order—i.e., assuming all terms of higher order than the second are negligible—it follows from Eq. (14) that at positive output terminal of the amplifier 20, the output voltage will be given by $$V_{OUT} = -(K_2a_2/K_1a_1)V_{IN}^2. \quad (15)$$

as is desired in a squaring circuit. The balanced output amplifier 20 then ensures that the voltage $-V_{OUT}$ developed at the negative ouput terminal of the amplifier is indeed the negative of the foregoing expression for $V_{OUT}$.

Each of $K_2$ and $K_1$ in the ratio $K_2/K_1$, all other things being equal, depends on transistor device channel length and width dimensions, so that the required matching $K_2 = K_3 = K_5 = K_6$ and $K_1 = K_4$ can be achieved very accurately—i.e., better than to within one percent—and to track with variation in processing parameters so that $K_2/K_1$ remains the same.

The circuits 100 (FIG. 1) and 200 (FIG. 2) are thus continuous-time squaring circuits in that they operate on continuous-time inputs and provide continuous-time outputs. Both these circuits require closely matched transistors, $T_2$ and $T_3$ in particular; any mismatch of these transistors can result in an undesired presence of odd-power terms, due to their non-exact cancellation, in the output $V_{OUT}$. Moreover, in the circuit 200 the transistors $T_1$ and $T_4$ should be matched. These requirements of matching, however, can be avoided by using the sampled-data squaring circuit 300 as depicted in FIG. 3.

Figure 3:
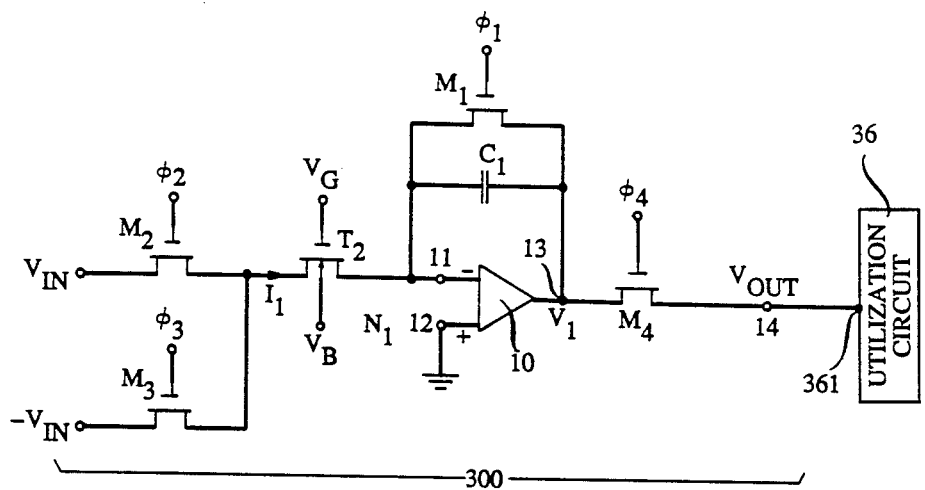
FIG. 3 is a schematic diagram of a squaring circuit, having a sampled-data configuration and having a single-ended output configuration, in accordance with yet another specific embodiment of the invention.

FIG. 3 shows a sampled-data squaring circuit 300. Those elements in FIG. 3 which are similar to those in FIG. 1 are denoted by the same reference labels.

Here in FIG. 3 the transistors $M_1$, $M_2$, $M_3$, and $M_4$ are clocked by clock pulse sequence $\phi_1$, $\phi_2$, $\phi_3$, and $\phi_4$, respectively. Each of $M_1$, $M_2$, $M_3$, and $M_4$ can be made in C-MOS, that is each of these transistors is an n-channel MOS transistor with a clock pulse sequence applied to its gate electrode, connected in parallel with a p-channel MOS transistor, with a complementary corresponding clock pulse sequence applied to its gate electrode. That is, each of the transistors $M_1$, $M_2$, $M_3$, and $M_4$ forms a clocked C-MOS transmission gate where $M_1$ is clocked by the clock pulse sequence $\phi_1$ (and $\bar{\phi}_1$), $M_2$ by $\phi_2$ (and $\bar{\phi}_2$), $M_3$ by $\phi_3$ (and $\bar{\phi}_3$), and $M_4$ by $\phi_4$ (and $\bar{\phi}_4$). As known in the CMOS art, the n-type tub for the p-channel transistors is biased at $V_{DD}$, typically $+5$ volts; the p-type tub for the n-chanel transistors is biased at ground.

Figure 4:
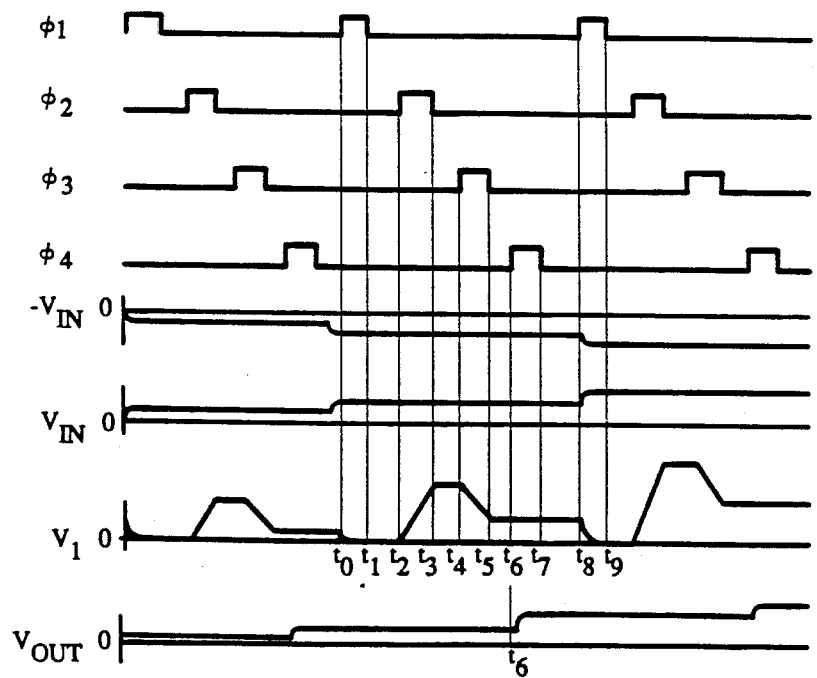
FIG. 4 is a timing diagram useful in describing the operation of the circuit shown in FIG. 3.

The timing of the clock pulse sequences is shown in FIG. 4. Advantageously, the clock sequences $\phi_1$, $\phi_2$, $\phi_3$, $\phi_4$ have mutually non-overlapping pulses, and hence these sequences are mutually non-overlapping as to the time intervals during which they turn on MOS transistors. The clocked transistor $M_4$ acts as a sampler of the voltage at the output terminal 13 of the operational amplifier 10, whereas the clocked transistors $M_2$ and $M_3$ act as samplers of input voltages $-V_{IN}$ and $V_{IN}$, respectively. Note that the resistor $R_1$ (FIG. 1) is replaced in the circuit 300 by a capacitor $C_1$ (FIG. 3) connected in parallel with the clocked transistor $M_1$. The capacitor $C_1$, in conjunction with the clocked transistor $M_1$, acts as an integrator of the current $I_1$ except during time intervals when $\phi_1$ turns on the transistor $M_1$—that is, during intervals $t_0t_1$, $t_8t_9$, etc. In this way, the capacitor $C_1$ converts the current $I_1$ to a voltage $V_1$ across the output and input terminals 13 and 11 of the operational amplifiers: $V_1 = -I_1 dt/C_1$, as more fully discussed below.

The input voltage $V_{IN}$ itself is assumed in FIG. 4 to have jumps at times $t_0$, $t_8$, etc.,—i.e., at the beginning of each clock cycle defined by the rising edge of $\phi_1$—but this is not essential; but it is always preferred that $V_{IN}$ should not change during the time interval $t_2 t_5$, i.e., during the time interval starting with $\phi_2$ going high and ending with $\phi_3$ going low, that is, $M_2$ turning on and $M_3$ off. As noted below, it is also important that the time intervals $t_2 t_3$ and $t_4 t_5$ be of equal duration—i.e., $t_2 t_3 = t_4 t_5$.

During operation when $\phi_1$ goes high and thus turns on $M_1$ (while $M_2$, $M_3$, and $M_4$ are off)—i.e., at time $t_0$ and then throughout the time interval $t_0 t_1$—the capacitor $C_1$ is discharged to 0 volts across it. Thereafter, when $\phi_2$ goes high and thus turns on $M_2$—i.e., at $t_2$ and throughout $t_2 t_3$—the current $I_1$ flows from $-V_{IN}$ through $M_2$ and $T_2$ into $C_1$. Advantageously, $M_2$ (as well as $M_3$) has a much lower on resistance than the (steady) resistance of $T_2$, so that the voltage drop across $M_2$ is negligible. Thus, the drain-to-source current $-I_1$ throughout the interval $t_2 t_3$ is found by inspection of Eq. (1) to be equal to:

$$-I_1 = K_2(+a_1 V_{IN} - a_2 V_{IN}^2 + a_3 V_{IN}^3 - a_4 V_{IN}^4 - \ldots ). \quad (16)$$

Meanwhile during $t_2 t_3$ the capacitor $C_1$ integrates this current $I_1$ to produce voltage $V_1$ across the output and input terminals 13 and 11 of the operational amplifier 10 as shown in FIG. 4. Again, the voltage at input terminal 11 will be essentially zero (ground) because the positive input terminal 12 of this amplifier is grounded.

Thereafter, when $\phi_3$ goes high and thus turns on $M_3$—i.e., at $t_4$ and throughout $t_4 t_5$—the current $I_1$, flows from $+V_{IN}$ through $M_3$ and $T_2$ into $C_1$, so that the current $I_1$ throughout the interval $t_4 t_5$ is given by $$I_1 = +K_2(a_1 V_{IN} + a_2 V_{IN}^2 + a_3 V_{IN}^3 + a_4 V_{IN}^4 + \ldots). \quad (17)$$

Meanwhile during $t_4 t_5$ the capacitor integrates this current $I_1$. Note that, in this integration during $t_4 t_5$, the odd-power terms in $I_1$, including the linear term $a_1 V_{IN}$, thus will cancel the contributions of odd-power terms in $I_1$ obtained earlier from the integration during $t_2 t_3$, provided that $V_{IN}$ essentially does not vary but remains essentially the same during $t_2 t_3$ as during $t_4 t_5$, and that these time invervals have equal duration: $t_2 t_3 = t_4 t_5$. Thus, at $t_5$ the voltage $V_1$ will contain only the even-power terms, i.e., essentially only the square term as desired, and hence $V_1$ is then valid at the output. Accordingly, subsequently during $t_6 t_7$ the clock sequence $\phi_4$ goes high and thus turns on $M_4$ to enable the voltage $V_1$ at the output terminal 13 of the amplifier 10 to appear at the circuit output terminal 14 as $V_{OUT}$. This output terminal 14 is connected to an input terminal 361 of a utilization circuit 36 for utilizing $V_{OUT}$.

Notice that, because the transistor $T_2$ time-shares the currents from $V_{IN}$ and $-V_{IN}$, proper operation of the circuit 300 for squaring the input does not require any transistor matching. All that is required is a low on-resistance for both $M_1$ and $M_2$.

Figure 5:
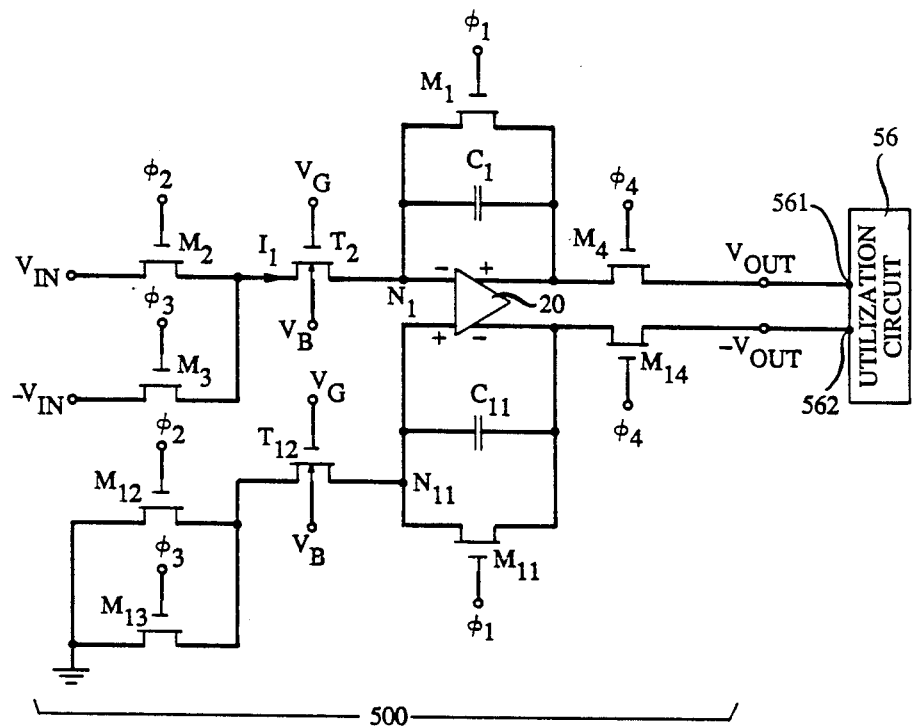
FIG. 5 is a schematic diagram of a squaring circuit, having a sampled-data configuration and having a balanced output configuration, in accordance with still another specific embodiment of the invention.

The sampled-data squaring circuit 300 (FIG. 3) is not balanced but develops its single-ended output voltage $V_{OUT}$ at its sole circuit output terminal 14 for delivery to a utilization circuit 36. The sampled-data squaring circuit 300 can be modified, however, so as to become a balanced sample-data squaring circuit 500, as depicted in FIG. 5. Elements in FIG. 5 that are similar to these depicted in FIG. 3 are denoted by the same reference labels. Here is FIG. 5, a mirror image (except for ground input) of the circuitry of FIG. 3 is added. Elements in the mirror image that correspond to the elements of FIG. 3 are denoted by the same subscript reference numerals plus ten. It is important that the transistor $T_2$ and $T_{12}$ are matched, and also that the capacitors $C_1$ and $C_{11}$ are also matched. A balanced output ($V_{OUT}$, $-V_{OUT}$) is thus delivered to input terminals 561 and 562 of a utilization circuit 56.

The circuit 500 (FIG. 5) operates relative to the circuit 300 (FIG. 3) in much the same way as the circuit 200 (FIG. 2) operates relative to the circuit 100 (FIG. 1), except that the capacitors $C_1$ and $C_{11}$ in the circuit 500 are linear devices for converting (charge and hence) current into voltage whereas $T_1$ and $T_4$ (FIG. 2) are nonlinear.

Typically, the gate bias $V_G$ in the circuits 300 and 500 is equal to 3.5 volts, rather than 1.5 volts as in the circuits 100 and 200, while the substrate bias $V_B$ is $-1.5$ volts in the circuits 300 and 500, just as in the circuits 100 and 200. By varying the gate bias $V_G$ in any of the circuits 100, 200, 300, and 500 the constant K and hence also the magnitude of $V_{OUT}$ can be modified.

Although the invention has been described in detail in terms of specific embodiments, various modifications may be made without departing from the scope of the invention. For example, the transistors $T_1$ and $T_4$ in FIG. 2 may be replaced by matched resistors. The transistors $M_1$, $M_2$, $M_3$, and $M_4$ (FIG. 3) can be made in N-MOS or P-MOS instead of C-MOS technology; and the transistors $T_1$, $T_2$, $T_3$, $T_4$, $T_5$, $T_6$ can be made in P-MOS instead of N-MOS technology.

What is claimed is:

1. An integrated circuit including circuitry for squaring a balanced input consisting of a first input voltage ($-V_{IN}$) and a second input voltage ($+V_{IN}$) which is equal in absolute magnitude to, but is of opposite polarity from, the first input voltage ($-V_{IN}$), said circuitry comprising:

(a) an amplifier having a positive and a negative input terminal and at least a first output terminal.

(b) a first current-to-voltage conversion means, connected across the first output terminal of the amplifier and the negative input terminal thereof, for supplying a first negative feedback from the output terminal to the negative input terminal of the amplifier; and (c) a first nonlinear voltage-to-current conversion means, connected to receive the first and second inputs ($-V_{IN}, +V_{IN}$), for nonlinearly converting these inputs ($-V_{IN}, +V_{IN}$) into a first current ($I_1$), and connected to deliver this current to the first current-to-voltage conversion means, whereby the amplifier develops at the first output terminal thereof an output ($V_{OUT}$) which is essentially linearly proportional to the square of the first input voltage ($V_{IN}^2$).

2. The circuit of claim 1 in which the first nonlinear voltage-to-current conversion means include a first nonlinear device connected to receive the first input voltage ($-V_{IN}$) and a second nonlinear device connected to receive the second input voltage ($+V_{IN}$).

3. The circuit of claim 2 in which the first and the second nonlinear voltage-to-current conversion device respectively comprises a first and a second MOS transistor, each of which is biased by a first and a second voltage bias applied to its gate and substrate, respectively, and each of which is operated in its non-saturation region.

4. The circuit of claim 2 further comprising:
   (a) second current-to-voltage conversion means, connected across a second output terminal of the amplifier and a positive input terminal thereof, for supplying a second feedback to the amplifier, and
   (b) second nonlinear voltage-to-current conversion means, connected to a reference voltage terminal, for nonlinearly converting the voltage at the reference voltage terminal into a second current, and connected to deliver the second current to the second current-to-voltage conversion means.

5. The circuit of claim 4 further comprising a utilization circuit having first and second input terminals, connected to the first and second output terminals of the amplifier, for utilizing the outputs developed at the output terminals of the amplifier.

6. The circuit of claim 1 in which the first nonlinear voltage-to-current conversion means include first and second clocked transistors, which are clocked to be on during mutually non-overlapping successive first and second time intervals, respectively, of mutually equal time duration during each clock cycle, the first and second clocked transistors being connected to receive the first and second input voltages, respectively, and for passing these input voltages to a first terminal of a nonlinear voltage-to-current conversion device.

7. The circuit of claim 6 in which the current-to-voltage conversion means comprises a capacitor having a first terminal which is connected to a second terminal of the nonlinear voltage-to-current conversion device and which is also connected to a first high-current carrying terminal of a third clocked transistor which is clocked to be on during a third time interval during each clock cycle, this third time interval preceding the first time interval of each such cycle and being nonoverlapping with both the first and the second time intervals, the capacitor having a second terminal which is connected to a second high-current carrying terminal of the third clocked transistor.

8. The circuit of claim 7 further comprising a utilization circuit for utilizing the output developed at the output terminal of the amplifier.

9. The circuit of claim 1 in which the amplifier is an operational amplifier.

10. The circuit of claim 9 further comprising a utilization circuit for utilizing the output developed at the output terminal of the amplifier.

11. An integrated circuit including circuitry for squaring an input voltage comprising:
   (a) an operational amplifier having a positive and a negative input terminal and at least a first output terminal;
   (b) first current-to-voltage conversion means, connecting the first output terminal of the operational amplifier to a negative input terminal thereof, for supplying a first negative feedback to the amplifier; and
   (c) first nonlinear voltage-to-current conversion means, connected to receive first and second balanced input voltages to be squared by the circuit, for generating and delivering a first current to the current-to-voltage conversion means in response to the input voltages, whereby the voltage developed at the first output terminal of the operational amplifier is essentially linearly proportional to the square of the first input voltage.

12. The circuit of claim 11 in which the first nonlinear voltage-to-current conversion means include a first MOS transistor plus first and second clocked transistors both of which are clocked to be on during mutually non-overlapping periodic first and second successive time intervals, respectively, of mutually equal time durations during each clock cycle, the first and second clocked transistors being connected to receive the first and second balanced input voltages, respectively, connected for passing the first input voltage during the first time interval of each cycle and the second input voltage during the second time interval of each cycle to a first high-current carrying terminal of the first MOS transistor operating in its non-saturation region.

13. The circuit of claim 12 in which the first current-to-voltage conversion means comprises a capacitor having a first terminal which is connected to a second high-current carrying terminal of the first MOS transistor and which is also connected to a first high-current carrying terminal of a third clocked transistor which is clocked to be on during each clock cycle during a third time interval thereof preceding the first time interval, this third time interval being nonoverlapping with respect to both the first and the second time intervals, the capacitor having a second terminal connected to a second high-current carrying terminal of the third clocked transistor and to the first output terminal of the amplifier.

14. The circuit of claim 13 further comprising a utilization circuit connected for utilizing the output voltage developed at the first output terminal of the amplifier.

15. The circuit of claim 11 further comprising
   second current-to-voltage conversion means, connecting a second output terminal of the amplifier and a positive input terminal thereof, for supplying a second feedback to the positive input terminal;
   second nonlinear voltage-to-current conversion means, connected to a reference voltage terminal, for nonlinearly converting the reference voltage into a second current, and connected to deliver the second current to the second current-to-voltage conversion means.

16. The circuit of claim 15 in which the first and the second nonlinear voltage-to-current conversion means respectively comprises a first and a second pair respectively of first and second clocked transistors, the first clocked transistors of the first and second pair both being clocked to be on during a first time interval of each clock cycle, the second clocked transistors of the first and the second pair both being clocked to be on during a second time interval following the first time interval of each such cycle, the first and second time intervals being mutually non-overlapping and having mutually equal time durations,
   the first and the second clocked transistors of the first pair being connected to receive the first and second balanced input voltages, respectively, and connected for periodically passing these input voltages to a first high-current carrying terminal of a first MOS transistor operating in its non-saturation region, and the first and second clocked transistors of the second pair both being connected to receive the reference voltage and being connected for passing the reference voltage to a first high-current carrying terminal of a second MOS transistor operating in its non-saturation region.

17. The circuit of claim 16 in which the first and second current-to-voltage conversion means respectively comprise separate first and second capacitors each having a separate first terminal which is connected to a second high-current carrying terminal of the first and second MOS transistors, respectively, and each having a separate second terminal which is separately connected to a first high-current carrying terminal of first and second auxiliary clocked transistors, respectively, each of the auxiliary clocked transistors being clocked to be on during a third time interval during each clock cycle, the third time interval following the second time interval during each such cycle and being nonoverlapping with both the first and the second time intervals.

18. The circuit of claim 17 further comprising a utilization circuit connected for utilizing the voltages developed at the first and second output terminals of the amplifier.

* * * * *